United States Patent [19]

Stingelin

[11] Patent Number: 4,940,783
[45] Date of Patent: Jul. 10, 1990

[54] DISAZO CONTAINING DIAMINOSTILBENE AS DIAZO COMPONENT AND AN ANILINE COUPLING COMPONENT BEARING A CATIONIC ALKYL AMMONIUM GROUP

[75] Inventor: Willy Stingelin, Reinach, Switzerland

[73] Assignee: Ciba-Geigy Corporation, Ardsley, N.Y.

[21] Appl. No.: 238,637

[22] Filed: Aug. 30, 1988

[30] Foreign Application Priority Data

Sep. 3, 1987 [CH] Switzerland .................. 3374/87

[51] Int. Cl.$^5$ .............. C09B 44/02; C09B 44/04; C09B 44/08; D06P 1/41
[52] U.S. Cl. .................... 534/605; 534/589; 534/604; 534/614; 534/615; 534/689; 534/691; 534/613; 106/22; 106/23
[58] Field of Search ............... 534/605, 614, 615, 689, 534/691, 613

[56] References Cited

U.S. PATENT DOCUMENTS

| | | | |
|---|---|---|---|
| 3,394,122 | 7/1968 | Seitz ................................. | 534/689 X |
| 3,529,921 | 9/1970 | Hegar et al. ........................ | 8/41 |
| 3,538,074 | 11/1970 | Hegar et al. ....................... | 260/156 |
| 4,116,861 | 9/1978 | Aftergut et al. ................... | 534/689 X |
| 4,521,591 | 6/1985 | Jan et al. ........................... | 534/689 X |

*Primary Examiner*—Floyd D. Higel
*Attorney, Agent, or Firm*—Kevin T. Mansfield; Edward McC. Roberts

[57] ABSTRACT

Disazo dyes which are suitable for dyeing and printing, especially of paper of all kinds. The dyes correspond to the formula

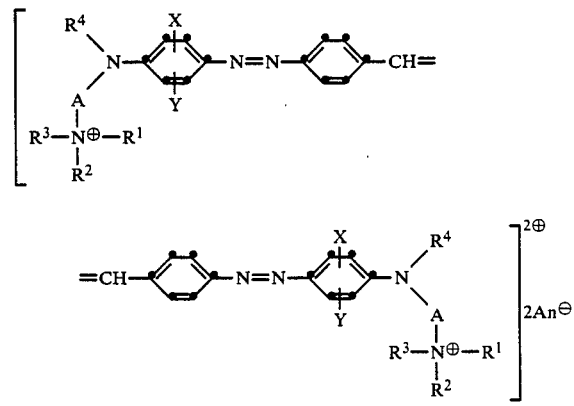

in which
$R^1$, $R^2$, $R^3$ and $R^4$ are each an alkyl radical,
A is an alkylene radical,
X and Y are nonionic substituents customarily in azo dyes and
An$^\ominus$ is an anion.

9 Claims, No Drawings

DISAZO CONTAINING DIAMINOSTILBENE AS DIAZO COMPONENT AND AN ANILINE COUPLING COMPONENT BEARING A CATIONIC ALKYL AMMONIUM GROUP

The invention relates to novel cationic disazo dyes, processes for their preparation and also to their use as dyes, in particular for dyeing textile materials and in particular paper.

The novel disazo dyes conform to the formula

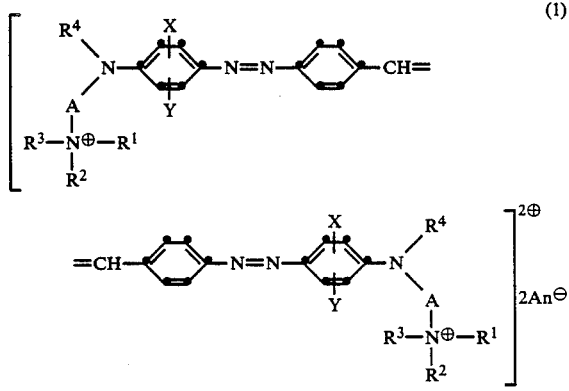

in which $R^1$, $R^2$, $R'$ and $R^4$ independently of one another are each a substituted or unsubstituted alkyl radical or $R^1$ and $R^2$ together with the nitrogen atom linking them or $R^1$, $R^2$ and $R^3$ together with the nitrogen atom linking them are a heterocyclic radical, A is an alkylene radical having 2 to 6 C atoms, X and Y independently of one another are hydrogen, halogen, $C_1$–$C_4$alkyl or $C_1$–$C_4$alkoxy which are unsubstituted or substituted by hydroxyl, halogen, cyano or $C_1$–$C_4$alkoxy and $An^{\ominus}$ is an anion.

$R^1$, $R^2$, $R^3$ and $R^4$ independently of one another are each a substituted or unsubstituted alkyl radical, for example methyl, ethyl, n-propyl or isopropyl, n-, sec- or tert-butyl, straight-chain or branched pentyl or hexyl, cyclopentyl or cyclohexyl, it being possible for these radicals to be substituted, for example by hydroxyl, cyano, phenyl or alkoxy. Examples of these substituted radicals are hydroxymethyl, hydroxyethyl, methoxyethyl, cyanoethyl, ethoxyethyl, propoxypropyl or benzyl.

$R^1$ and $R^2$ together with the nitrogen atom linking them can also be a heterocyclic radical, for example a pyrrolidine, piperidine, morpholine or piperazine radical, or $R^1$, $R^2$ and $R^3$ together with the nitrogen atom linking them form a heterocyclic radical, for example a pyridinium or monoquaternized triethylenediamine radical.

Preferably, $R^1$, $R^2$ and $R^3$ independently of one another are each $C_1$–$C_3$-alkyl or hydroxyethyl, in particular are each methyl or hydroxyethyl or $R^1$, $R^2$ and $R^3$ together with the nitrogen atom linking them are a pyridinium radical.

In particular, $R^4$ is an unsubstituted $C_1$–$C_{12}$alkyl radical, especially a $C_1$–$C_4$alkyl radical, methyl and ethyl being particularly preferred.

A is an alkylene radical having 2–6 C atoms, which is branched or preferably unbranched and can be substituted, for example by hydroxyl. Suitable radicals are for example: ethylene, ethylidene, propylene, trimethylene, ethylethylene, 1-methyl-1,3-trimethylene, pentamethylene, hexamethylene or 2-hydroxy-1,3-trimethylene.

Of these, preference is given to propylene, trimethylene, 2-hydroxy-1,3-trimethylene and in particular ethylene.

X and Y independently of one another are each hydrogen, halogen such as bromine or in particular chlorine, $C_1$–$C_4$alkyl or $C_1$–$C_4$alkoxy, it being possible for these latter groups to be substituted by hydroxyl, halogen such as bromine or in particular chlorine, cyano or $C_1$–$C_4$alkoxy. Preferably, X is hydrogen or methyl and Y is hydrogen, methyl, methoxy or chlorine.

Anions $An^{\ominus}$ can be inorganic but also organic anions; examples of these are: halide such as chloride, bromide or iodide, sulfate, methylsulfate, boron tetrafluoride, aminosulfonate, perchlorate, carbonate, bicarbonate, phosphate, phosphomolybdate, phosphotungstate, phosphotungstomolybdate, benzenesulfonate, naphthalenesulfonate, 4-chlorobenzenesulfonate, oxalate, maleate, acetate, propionate, lactate, succinate, chloroacetate, tartrate, methanesulfonate or benzoate ions, or complex anions such as that of zinc chloride double salts.

In general, the anion is predetermined by the preparation process. Preferably, chlorides, hydrogensulfates, sulfates, methosulfates, phosphates, formates, lactates or acetates are present. The anions can be exchanged for other anions in a known manner.

A preferred embodiment of the invention relates to disazo dyes of the formula (1), in which $R^1$, $R^2$ and $R^3$ independently of one another are each $C_1$–$C_3$alkyl or hydroxyethyl or $R^1$, $R^2$ and $R^3$ together with the nitrogen atom linking them form a pyridinium radical, $R^4$ is a $C_1$–$C_4$alkyl radical, A is propylene, trimethylene, 2-hydroxy-1,3-trimethylene or ethylene, X is hydrogen, Y is hydrogen, methyl, methoxy or chlorine and $An^{\ominus}$ is an anion.

The preparation of the disazo dyes of the formula (1) is carried out in a manner known per se, for example by tetrazotizing 1 mole of 4,4'-diaminostilbene and reacting the intermediate with 2 moles of a coupling component of the formula

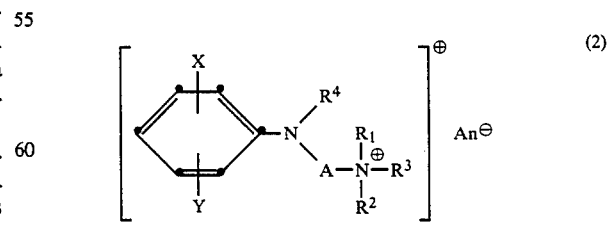

X, Y, A, $R^1$, $R^2$, $R^3$, $R^4$ and $An^{\ominus}$ having the meanings and preferences given above.

The coupling components of the formula (2) are known or can be obtained in a known manner. Particularly preferable compounds of the formula (2) are, for example, the following

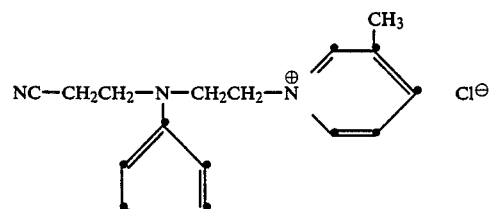

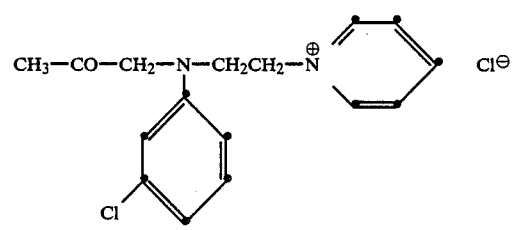

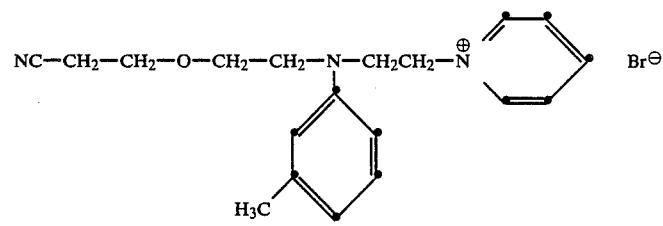

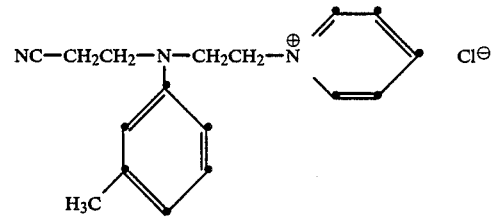

Furthermore N-2-(N'-phenyl-N'-β-cyanoethyl)-aminoethylpyridinium chloride or bromide, N-2-(N'-phenyl-N'-β-acetoxyethyl)-aminoethylpyridinium chloride, N-2-(N'-phenyl-N'-β-cyanoethoxyethyl)-aminoethylpyridinium chloride and the like. These compounds can be obtained by reaction of the corresponding N-(haloalkyl)aniline with a secondary or tertiary heterocyclic base, for example with pyridine, morpholine, thiomorpholine, quinoline, piperidine, pyrimidine, pyrrolidine, and the like.

The tetrazotization and the coupling are carried out under the usual conditions.

The disazo compounds of the formula (1) are used not only as powder or granule formulations but also in the form of concentrated solutions. Powder forsulations are standardized in a conventional manner in the presence of dustproofing agents by using standardizing agents such as sodium sulfate, sodium phosphate, sodium chloride or sodium acetate, or the azo compounds are marketed directly as spray-dried formulations. Concentrated dye solutions can be of the aqueous or aqueous-/organic type, conventional and readily degradable additives being preferably used such as organic acids, preferably acetic acid, formic acid, lactic acid, citric acid, amides such as formamide, dimethylformamide, urea, alcohols such as glycol, digylcol, diglycol ether, preferably methyl or ethyl ether.

The disazo compounds of the formula (1) are used in particular as dyes for the dyeing and printing of textile materials, paper, leather and for preparing inks. Suitable textile materials are natural and synthetic cationically dyeable materials. Preferably, the novel azo compounds are used for dyeing and printing paper, paperboard and cardboard in the pulp and on the surface and also textile materials advantageously consisting, for example, of homopolymers or mixed polymers of acrylonitrile or of synthetic polyamides or polyesters which have been modified by acid groups. These textile materials are dyed preferably in an aqueous, neutral or acid medium by the exhaust method under atmospheric or superatmospheric pressure, or by the continuous method. This textile material can be present in a variety of forms, for example as fibre, thread, woven fabric, knitted fabric, piece goods and made-up goods, such as shirts or sweaters.

Using the dyes according to the invention, level dyeings or prints can be produced which are notable for very good general fastness properties, in particular a very high degree of exhaustion and good water fastness properties.

Furthermore, the novel disazo compounds of the formula (1) can also be used for dyeing and printing natural and regenerated cellulose materials, in particular cotton and viscose, again to deep shades.

The novel disazo compounds of the formula (1) have good exhaustion properties and a high degree of exhaustion on these textile materials, and the dyeings obtained have very good fastness properties, in particular wet fastness properties.

The novel disazo compounds of the formula (1) are preferably used for dyeing paper of any kind, in particular bleached unsized and sized lignin-free paper, it being possible to start with bleached or unbleached cellulose and to use hardwood or softwood cellulose such as birch and/or fir sulfite and/or sulfate cellulose. These compounds are very particularly suitable for dyeing unsized paper (for example serviettes, tablecloths, hygienic tissues) as a consequence of their high affinity for this substrate.

The novel disazo compounds of the fomula (1) have very good exhaustion properties on these substrates, leaving the waste water virtually colourless.

They give dyeings in yellow, yellow-orange or red shades.

The dyeings obtained are notable for good general fastness properties in combination with high clarity, colour strength and wet fastness properties, that is, they do not tend to bleed when wet dyed paper is brought into contact with moist white paper. In addition, they have good alum, acid and alkali fastness properties. The wet fastness property refers not only to water but also to milk, juices and sweetened mineral water; because of their good alcohol fastness property, they are also resistant to alcoholic drinks. This property is desirable, for example, in particular for serviettes and tablecloths where it is foreseeable that the dyed paper will come into contact in the wet state (for example soaked in water, alcohol, surfactant solution etc.) with other surfaces such as textiles, paper and the like, which have to be protected from soiling.

The high affinity for paper and the high rate of exhaustion of the novel dyes is a great advantage for the dyeing of paper by the continuous process.

The examples which follow illustrate the invention without limiting it thereto. Parts (P) are by weight—unless noted otherwise—and the temperatures are in degrees Celsius; dH means degree of German hardness.

The abbreviation RKN is a quality description and indicates the degree of purity of the cellulose; the abbreviation SR (Schopper-Riegler) indicates freeness.

EXAMPLE 1

4.2 parts of 4,4′diaminostilbene are suspended in 30 parts of water, 30 parts of ice and 14 parts of 32% hydrochloric acid and tetrazotized with 10 parts per volume of 4N sodium nitrite solution at 0°-5°. A solution of 10.7 parts of N-2-(N′-phenyl-N′-ethyl)aminoethylpyridinium chloride in 80 parts of water is then added to the tetrazotized solution, the coupling mixture is adjusted to pH 3-4 with crystalline sodium acetate and stirred for 8 hours. 3.6 parts of sodium chloride are then added and then 6 parts of 50% zinc chloride solution are added dropwise.

The precipitated dye is filtered off, washed with ethanol and then with acetone and dried at 60° in vacuo. 16.6 parts of the dye of the formula

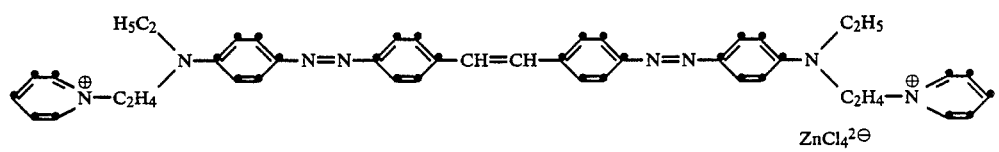

are obtained in the form of a powder which is soluble in dilute formic acid and dyes paper in orange hues.

EXAMPLE 2

The procedure described in Example 1 is repeated, except that 11.7 parts of N-2-(N′-phenyl-N′-n-butyl)aminoethylpyridinium chloride are used to give 15 parts of the dyestuff of the formula

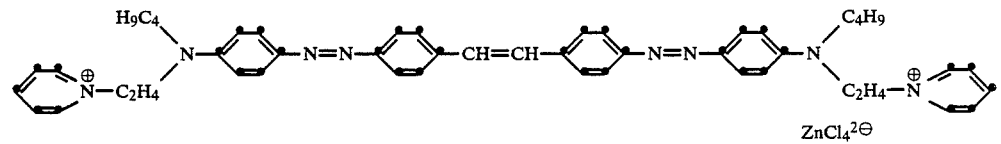

EXAMPLES 3-18

The dyes listed in the table which follows are obtained by the same procedure

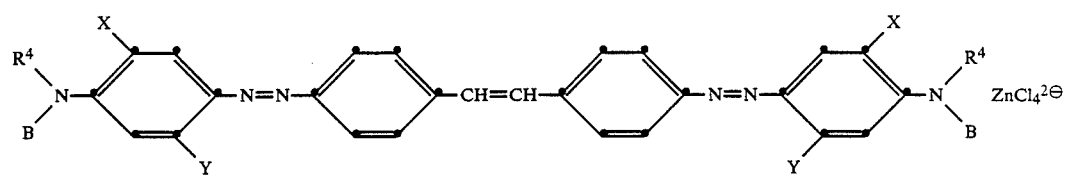

| Beispiel | R⁴ | B | Y | X |
|---|---|---|---|---|
| 3 | —CH₃ | —CH₂—CH₂—N⁺(pyridinyl) | H | H |
| 4 | —C₃H₇ | —CH₂—CH₂—N⁺(pyridinyl) | H | H |
| 5 | —C₅H₁₁ | —CH₂—CH₂—N⁺(pyridinyl) | H | H |
| 6 | —C₈H₁₇ | —CH₂—CH₂—N⁺(pyridinyl) | H | H |
| 7 | —C₂H₅ | —CH₂—CH₂—N⁺(C₂H₄OH)₃ | H | H |
| 8 | —C₂H₅ | —CH₂—CH₂—N⁺(C₂H₄OH)(morpholinyl) | H | H |
| 9 | —C₂H₅ | —CH₂—CH(OH)—CH₂—N⁺(CH₃)₃ | —CH₃ | H |
| 10 | —C₂H₅ | —CH₂—CH₂—N⁺(pyridinyl) | —CH₃ | H |
| 11 | —CH₃ | —CH₂—CH₂—N⁺(pyridinyl) | —CH₃ | —CH₃ |
| 12 | —C₂H₅ | —CH₂—CH₂—N⁺(pyridinyl) | —CH₃ | —CH₃ |
| 13 | —C₃H₇ | —CH₂—CH₂—N⁺(pyridinyl) | —CH₃ | —CH₃ |
| 14 | —C₂H₅ | —CH₂—CH₂—N⁺(C₂H₄OH)₃ | —CH₃ | —CH₃ |
| 15 | —C₂H₅ | —CH₂—CH₂—N⁺(2-methylpyridinyl) | H | H |
| 16 | —C₂H₅ | —CH₂—CH₂—N⁺(4-methylpyridinyl) | H | H |

-continued

| Beispiel | R⁴ | B | Y | X |
|---|---|---|---|---|
| 17 | —C₂H₅ | —CH₂—CH₂—N⁺(CH₃)(H)— [5-ring with H] | H | H |
| 18 | —C₂H₅ | —CH₂—CH₂—N⁺(CH₃)(H)— [6-ring with H] | H | H |

EXAMPLE 19

50 parts of chemically bleached beech sulfite are mixed with 50 parts of bleached RKN 15 (SR freeness 22°) and 2 parts of the dye of Example 1 in water (pH 6, waterhardness 10° dH), temperature 20° C., goods to liquor ratio 1:40). After stirring for 15 minutes, paper sheets are produced on a Frank sheet former.

The paper is dyed in an orange shade. The wastewater is virtually colourless. The degree of exhaustion is almost 100%. The light- and wetfastness properties are excellent.

EXAMPLE 20

A paper web of bleached beech sulfite (22° SR) is prepared on a continously operating laboratory paper machine. Ten seconds before the stock preparation, an aqueous solution of the dye of Example 1 is added continuously to the dilute pulp with vigorous turbulence (0.5% colouration, goods to liquor ratio 1:400, water hardness 10° dH, pH 6, temperature 20° C.).

The paper web is coloured in a strong orange shade of average intensity. The wastewater is completely colourless.

EXAMPLE 21

10 parts of cotton fabric (bleached mercerised cotton) are dyed in a laboratory beam dyeing machine in 200 parts of a liquor (water hardness 10° dH, pH 4, 3 circulations of the liquor per minute) which contains 0.05 part of the dye Example 1. The temperature is raised in the course of 60 minutes from 20° to 100° C., then kept constant for 15 minutes.

The dyebath is completely exhausted and the cotton fabric is dyed in a strong orange shade of good lightfastness and very good wetfastness.

If textile fabric of regenerated cellulose (viscose) is dyed by the same procedure, the dye of Example 1 gives on this material a strong yellowish orange dyeing of good lightfastness and very good wetfastness properties.

What is claimed is:

1. A disazo dye of the formula

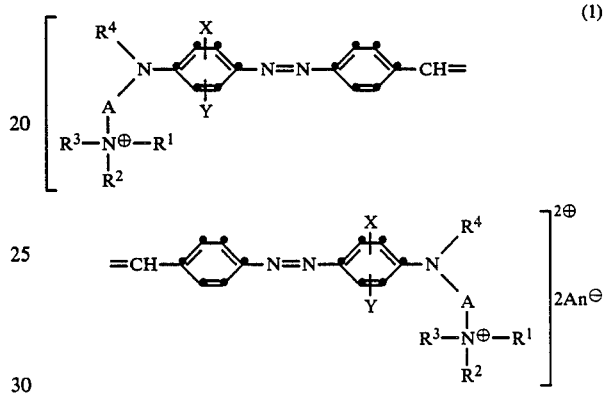

in which
R¹, R², R³ and R⁴ independently of one another are each an unsubstituted alkyl radical, an alkyl radical which is substituted by hydroxy, cyano, phenyl or alkoxy or R₁ and R₂ together with the nitrogen atom linking them are a pyrrolidine, piperidine morpholine or piperazine radical, or R¹, R² and R³ together with the nitrogen atom joining them are a pyridinium or triethylenediamine radical,
A is an alkylene radical having 2 to 6 C atoms,
X and Y independently of one another are hydrogen, halogen, C₁–C₄alkyl or C₁–C₄alkoxy which are unsubstituted or substituted by hydroxyl, halogen, cyano or C₁–C₄alkoxy and An⁻ is an anion.

2. A disazo dye according to claim 1, in which R¹, R², R³ and R⁴ independently of of one another are each methyl, ethyl, n-propyl or isopropyl, n-, sec- or tert-butyl, straight-chain or branched pentyl or hexyl, cyclopentyl or cyclohexyl, which radicals are unsubstituted or substituted by hydroxyl, cyano, phenyl or alkoxy, or in which R¹ and R² together with the nitrogen atom linking them form a pyrrolidine, piperidine, morpholine or piperazine radical, or in which R¹, R² and R³ together with the nitrogen atom linking them form a pyridinium or monoquaternized triethylenediamine radical.

3. A disazo dye according to claim 2, in which R¹, R² and R³ independently of one another are each C₁–C₃alkyl or hydroxyethyl or R¹, R² and R³ together with the nitrogen atom linking them form a pyridinium radical.

4. A disazo dye according to claim 1, in which R⁴ is an unsubstituted C₁–C₁₂alkyl radical.

5. A disazo dye according to claim 1, in which A is ethylene. ethylidene, propylene, trimethylene, ethylethylene, 1-methyl-1,3-trimethylene, pentamethylene, hexamethylene or 2-hydroxy-1,3-trimethylene, in particular propylene, trimethylene, 2-hydroxy-1,3-trimethylene or ethylene.

6. A disazo dye according to claim 1, in which X is hydrogen or methyl.

7. A disazo dye according to claim 1, in which Y is hydrogen, methyl, methoxy or chlorine.

8. A disazo dye according to claim 1, in which $R^1$, $R^2$ and $R^3$ independently of one another are each $C_1$–$C_3$alkyl or hydroxyethyl or $R^1$, $R^2$ and $R^3$ together with the nitrogen atom linking them form a pyridinium radical, $R^4$ is a $C_1$–$C_4$alkyl radical, A is propylene, trimethylene, 2-hydroxy-1,3-trimethylene or ethylene, X is hydrogen, Y is hydrogen, methyl, methoxy or chlorine and $An^\ominus$ is an anion.

9. A disazo dye according to claim 4 in which $R^4$ is a $C_1$–$C_4$-alkyl radical.

* * * * *